(12) United States Patent
Tanaka et al.

(10) Patent No.: US 10,518,375 B2
(45) Date of Patent: Dec. 31, 2019

(54) PRODUCTION SYSTEM, PRODUCTION APPARATUS AND METHOD FOR CONTROLLING PRODUCTION SYSTEM

(71) Applicant: CANON KABUSHIKI KAISHA, Tokyo (JP)

(72) Inventors: Masahiro Tanaka, Yokohama (JP); Kensuke Uehara, Atsugi (JP); Yoshitaka Okazaki, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/002,031

(22) Filed: Jun. 7, 2018

(65) Prior Publication Data

US 2018/0361523 A1  Dec. 20, 2018

(30) Foreign Application Priority Data

Jun. 16, 2017  (JP) ................................. 2017-118513
May 11, 2018  (JP) ................................. 2018-092565

(51) Int. Cl.
*B65G 39/00* (2006.01)
*B65G 43/00* (2006.01)
*B65G 43/08* (2006.01)
*B23Q 15/22* (2006.01)
*B23Q 16/00* (2006.01)
*G05B 19/418* (2006.01)

(52) U.S. Cl.
CPC .......... *B23Q 15/22* (2013.01); *B23Q 16/005* (2013.01); *G05B 19/41815* (2013.01); *B23Q 2707/16* (2013.01); *G05B 2219/31276* (2013.01)

(58) Field of Classification Search
None
See application file for complete search history.

(56) References Cited

U.S. PATENT DOCUMENTS 3,684,080 A * 8/1972 Van Nest ............... B65G 17/20
 198/687
4,534,462 A * 8/1985 Hoover ................ B65G 47/261
 198/781.06

(Continued)

FOREIGN PATENT DOCUMENTS

JP      2004-070469 A    3/2004
JP      2016-193484 A   11/2016

*Primary Examiner* — Kavel Singh
(74) *Attorney, Agent, or Firm* — Venable LLP (57) ABSTRACT

A production apparatus includes a workbench, a movement apparatus, a conveyance apparatus, a motion detector, and a control unit. The movement apparatus configured to move the workpiece on the workbench to a predetermined delivery position. The conveyance apparatus configured to convey the workpiece moved to the predetermined delivery position to an adjacent production apparatus. The motion detector configured to detect conveyance motion of the conveyance apparatus of the adjacent production apparatus. The control unit configured to operate the movement apparatus to move the workpiece on the workbench to the predetermined delivery position. If conveyance motion of the conveyance apparatus of the adjacent production apparatus is detected by the motion detector, the control unit operates the conveyance apparatus to convey the workpiece to a delivery position of the adjacent production apparatus.

14 Claims, 9 Drawing Sheets

(56) References Cited

U.S. PATENT DOCUMENTS

| | | | |
|---|---|---|---|
| 6,591,488 B1 * | 7/2003 | Tachibana | B23P 19/001 29/771 |
| 8,813,947 B1 * | 8/2014 | Tracy | B65G 47/82 198/435 |
| 2016/0288329 A1 | 10/2016 | Hashimoto et al. | |

* cited by examiner

PRODUCTION SYSTEM, PRODUCTION APPARATUS AND METHOD FOR CONTROLLING PRODUCTION SYSTEM

BACKGROUND OF THE INVENTION

Field of the Invention

The present invention relates to a production system in which a plurality of production apparatuses are arranged adjacently, a method for controlling the same, and a production apparatus thereof.

Description of the Related Art

Recently, in the manufacturing industry, along with the increase of small-volume production of large varieties of products and shortening of production model life cycles, there are demands for production apparatuses constituting manufacturing lines that are configured to cope with variations of productions and changes of models. For example, there are ideas related to composing a manufacturing line with general-purpose robot cells, i.e., robot stations, having a standardized size, shape and interface for cooperating with adjacent devices, so as to cope with the variations of productions and changes of models. For example, an articulated robot may be used as a manipulator of the robot cells serving as the production apparatus, and as another example, an orthogonal robot composed of a combination of movement apparatuses so-called stages, or tables, may be used.

Cells, or stations, adopting the orthogonal robots can be implemented relatively easily and inexpensively compared to adopting the articulated robots, and standardization of a manufacturing line composed by arranging a plurality of orthogonal robots can be realized easily. For example, Japanese Patent Laid-Open No. 2016-193484 discloses a manufacturing line composed by arranging production apparatuses adopting the above-described type of orthogonal robots.

Further, in composing manufacturing lines by arranging a plurality of production apparatuses composed of cells, i.e., stations, adopting orthogonal robots, conveyance apparatuses that transfers workpieces among production apparatuses may be composed of rectilinear stages, i.e., tables, configured to move the workpiece linearly. In such stages, i.e., tables, control is performed to operate the conveyance apparatuses simultaneously in synchronization in the same direction, for example, to enter to or retreat from the space for transferring workpieces with an adjacent production apparatus.

However, the manufacturing line disclosed in Japanese Patent Laid-Open No. 2016-193484 respectively ensures a position for retrieving the workpiece conveyed from the conveyance apparatus having performed the former processing step and a position for placing the workpiece having completed to the process performed in the apparatus of the present processing step. That is, a configuration is adopted in which the adjacent conveyance apparatuses are arranged at positional relationships so as not to interfere with one another. Therefore, the required space used for conveying components in each robot cell corresponds to a size of two workpieces or greater, and there was a drawback that a large space is required for conveying components.

SUMMARY OF THE INVENTION

According to a first aspect of the present invention, a production system in which a plurality of production apparatuses are arranged adjacently. Each of the production apparatuses includes a workbench on which a workpiece is placed, configured to subject the workpiece to a predetermined operation, a movement apparatus configured to move the workpiece subjected to the predetermined operation on the workbench to a predetermined delivery position, a conveyance apparatus configured to convey the workpiece moved to the predetermined delivery position to an adjacent production apparatus, a motion detector configured to detect conveyance motion of the conveyance apparatus of the adjacent production apparatus, and a control unit configured to operate the movement apparatus to move the workpiece on the workbench to the predetermined delivery position, and if conveyance motion of the conveyance apparatus of the adjacent production apparatus is detected by the motion detector, the control unit operates the conveyance apparatus to convey the workpiece to a delivery position of the adjacent production apparatus. The plurality of production apparatuses are arranged such that a conveyance area of the conveyance apparatus of the production apparatus is overlapped with the conveyance area of the conveyance apparatus of the adjacent production apparatus.

According to a second aspect of the present invention, a production apparatus includes a workbench on which a workpiece is placed, configured to subject the workpiece to a predetermined operation, a movement apparatus configured to move the workpiece subjected to the predetermined operation on the workbench to a predetermined delivery position, a conveyance apparatus configured to convey the workpiece moved to the predetermined delivery position to an adjacent production apparatus, a motion detector configured to detect conveyance motion of the conveyance apparatus of the adjacent production apparatus, and a control unit configured to operate the movement apparatus to move the workpiece on the workbench to the predetermined delivery position, and if conveyance motion of the conveyance apparatus of the adjacent production apparatus is detected by the motion detector, the control unit operates the conveyance apparatus to convey the workpiece to a delivery position of the adjacent production apparatus.

According to a third aspect of the present invention, a method for controlling a production system in which a plurality of production apparatuses are arranged adjacently, wherein each of the production apparatuses includes a workbench on which a workpiece is placed, configured to subject the workpiece to a predetermined operation, a movement apparatus configured to move the workpiece subjected to the predetermined operation on the workbench to a predetermined delivery position, a conveyance apparatus configured to convey the workpiece moved to the predetermined delivery position to an adjacent production apparatus, a motion detector configured to detect conveyance motion of the conveyance apparatus of the adjacent production apparatus, and a control unit configured to control the conveyance apparatus. The plurality of production apparatuses are arranged such that a conveyance area of the conveyance apparatus of the production apparatus is overlapped with a conveyance area of the conveyance apparatus of the adjacent production apparatus. The control unit performs control to operate the movement apparatus and move the workpiece on the workbench to the predetermined delivery position, and if conveyance motion of the conveyance apparatus of the adjacent production apparatus is detected by the motion detector, the control unit operates the conveyance apparatus to convey the workpiece to a delivery position of the adjacent production apparatus.

Further features of the present invention will become apparent from the following description of exemplary embodiments with reference to the attached drawings.

DESCRIPTION OF THE EMBODIMENTS

Now, embodiments for carrying out the present invention will be described with reference to the drawings. The configurations illustrated below are mere examples, and detailed configurations can be modified arbitrarily by those skilled in the art without deviating from the scope of the present invention.

First Embodiment

Figure 1:
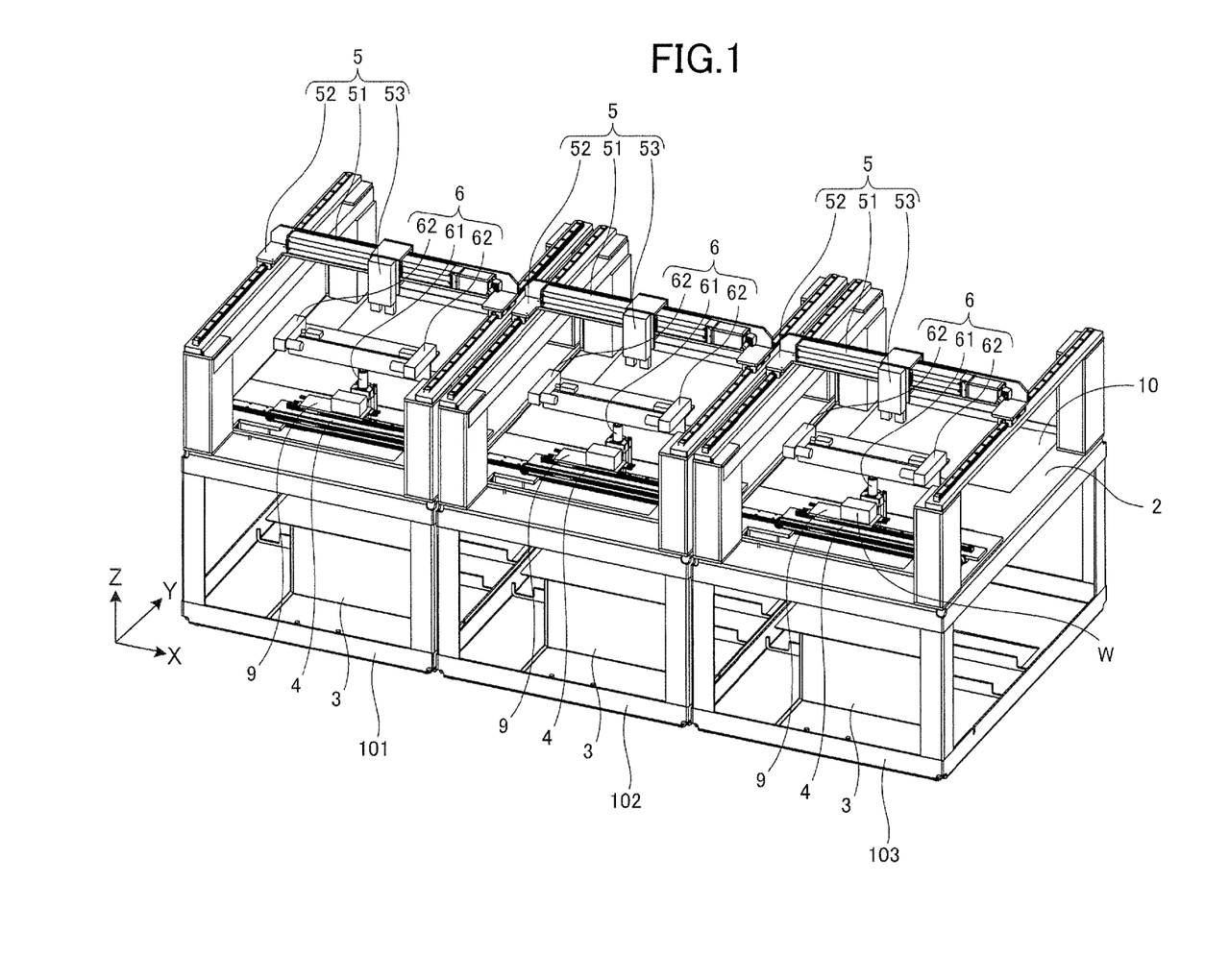
FIG. 1 is a perspective view illustrating an overall configuration of a production system according to an embodiment of the present invention.

FIG. 1 illustrates, as an example in which the present invention is implemented, a configuration example of a manufacturing line of a production system composed by arranging a plurality of robot stations (hereinafter simply referred to as stations) as production apparatuses. The manufacturing line of FIG. 1 is composed of a station 101, a station 102 and a station 103 arranged in a row. An example of a production system where three stations are arranged is described here, but the number of stations being arranged is not limited to three in any of the embodiments of the present invention. The stations 101 through 103 adopt the same or similar configurations, and the components are assigned with the same reference numbers within the stations. For sake of convenience of drawing, some reference numbers are mainly only shown in station 103, but it is assumed that similar reference numbers are assigned to equivalent components in other stations 101 and 102. On the lower left of FIG. 1, X-, Y- and Z-axis directions of a three-dimensional coordinate system used in the present production system is illustrated.

Stations 101 through 103 are composed by disposing a conveyance apparatus 4, an assembly robot 5 and a workbench 6 on an assembly base 2, i.e., base, composed by assembling L-angle members as illustrated.

The workbench 6 is a table on which a workpiece W is placed and subjected to predetermined operations. The workbench 6 is composed of a positioning mechanism 62 having a clamping mechanism for determining X and Y directions, i.e., horizontal directions, of a work position of the workpiece W, and a first lifting apparatus, i.e., Z-axis movement apparatus 61, determining the Z-axis direction, i.e., vertical direction, of work position of the positioning mechanism 62. Now, the clamping mechanism of the positioning mechanism 62 is movable in the horizontal direction to correspond to the shape of the workpiece W, so that various shapes of workpiece W can be supported.

The assembly robot 5 serving as a movement apparatus is an apparatus configured to move the workpiece W subjected to predetermined operation on the workbench 6 to a predetermined delivery position in the own production apparatus. The assembly robot 5 is an orthogonal robot including a hand 53 serving as a gripping apparatus for manipulating the workpiece W and an orthogonal stage apparatus for moving the hand 53 in X and Y directions, i.e., horizontal direction, within the operation range on the assembly base 2 so as to position the hand 53 to a work position. The orthogonal stage is composed of an X-axis movement apparatus 51 and a Y-axis movement apparatus 52.

Figure 2A:
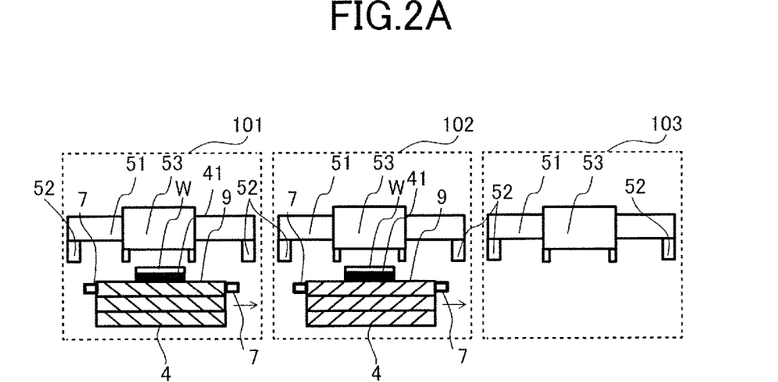
FIG. 2A is a view illustrating a conveyance apparatus at an original start position prior to conveyance.
Figure 2B:
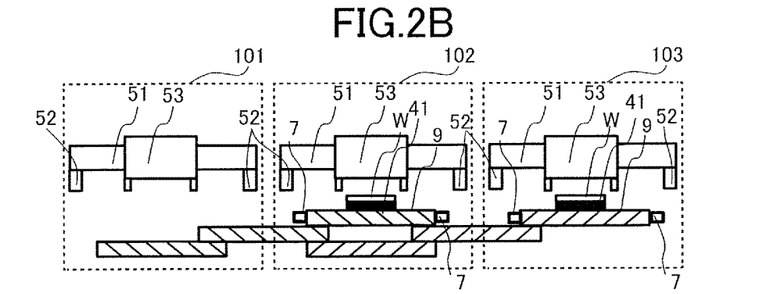
FIG. 2B is a view illustrating the conveyance apparatus at a position after being conveyed to a downstream direction.
Figure 2C:
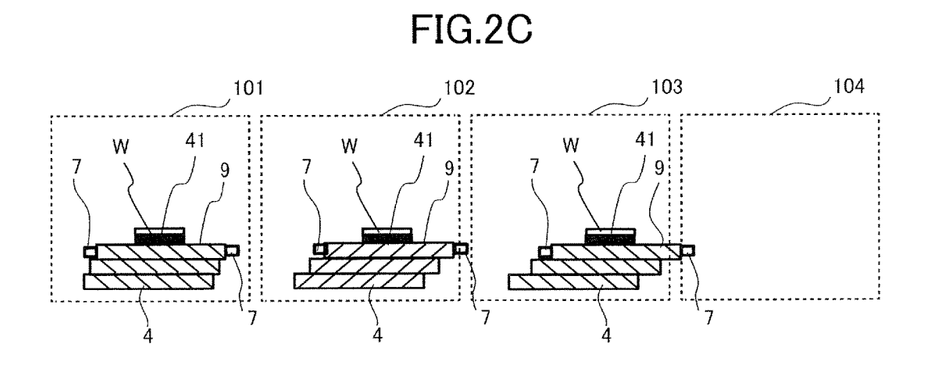
FIG. 2C is a view illustrating the conveyance apparatus at the time of start of conveyance to the downstream direction.

The conveyance apparatus 4 is an apparatus configured to convey the workpiece W having been moved to the delivery position and put on the conveyance apparatus to the adjacent station. The workpiece W moved to the delivery position is conveyed by the conveyance apparatus 4 and enters an area on the assembly base 2 of the adjacent station along the X-axis direction, for example. The conveyance apparatus 4 is composed, for example, of an expandable rail member composed of multiple stages, three stages in the example of FIGS. 2A through 2C, as illustrated in FIGS. 2A through 2C, and the uppermost stage is referred to as a workpiece table 9. The workpiece table 9 is equipped with a second lifting apparatus, i.e., Z-axis movement apparatus 41, which can move the workpiece W in the Z-axis direction, i.e., vertical direction.

The workpiece W on the workpiece table 9 conveyed from an adjacent station is moved in the Z-axis direction, i.e., vertical direction, by the Z-axis movement apparatus 41 of the adjacent station, and is gripped by the hand 53 positioned by the orthogonal stage apparatus (51, 52). An example is illustrated of a case where the Z-axis movement apparatus 41 is placed on the workpiece table 9, but a configuration equipped with a mechanism that lifts the whole conveyance apparatus 4 can also be adopted. If the workbench 6 is arranged above the conveyance apparatus 4 in the Z-axis direction, i.e., vertical direction, the first lifting apparatus, i.e., Z-axis movement apparatus 61, is lifted, and the workpiece W can be held by the hand 53.

The respective stations are arranged such that the conveyance area of one station is overlapped with the conveyance area of the adjacent station. By adopting the arrangement, the manufacturing line of the present invention does not require a large conveyance space.

By expanding the conveyance apparatus 4, the workpiece table 9 can enter the assembly base 2 of the station adjacent on the right side or a station adjacent on the left side of its own production apparatus illustrated in FIG. 1. In the present embodiment, the production system is formed in a compact manner, since there is no need to secure a dedicated area for transferring workpieces between adjacent stations 101 through 103.

FIG. 2A illustrates a state in which the conveyance apparatuses 4 of the stations 101 and 102 are respectively positioned at their original start positions. In this state, each conveyance apparatus 4 composed of three-stage rails is contracted as illustrated, and the workpiece W and the workpiece table 9 are positioned at the area above the assembly base 2 of its own production apparatus without entering the adjacent station.

FIG. 2B illustrates a state where the conveyance apparatus 4 is expanded to transfer the workpiece W to the adjacent station. In the present embodiment, no dedicated area is secured for transferring the workpiece. Therefore, in order to expand the conveyance apparatus 4 of the station 101, it is necessary to perform control to expand the conveyance apparatus 4 of the adjacent station 102 so that the conveyance apparatus 4 of the station 101 and the conveyance apparatus 4 of the station 102 do not interfere.

Figure 4:
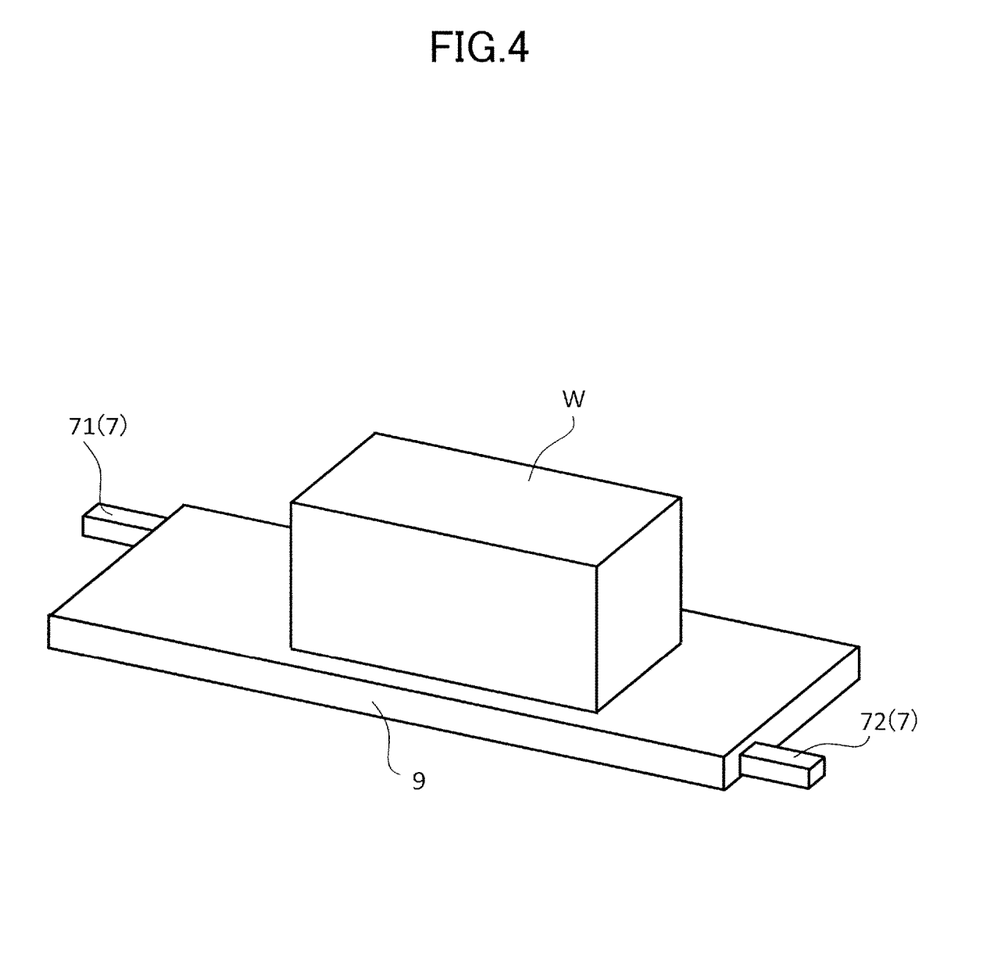
FIG. 4 is a perspective view illustrating a configuration example of a workpiece table conveyed by the conveyance apparatus.
Figure 5:
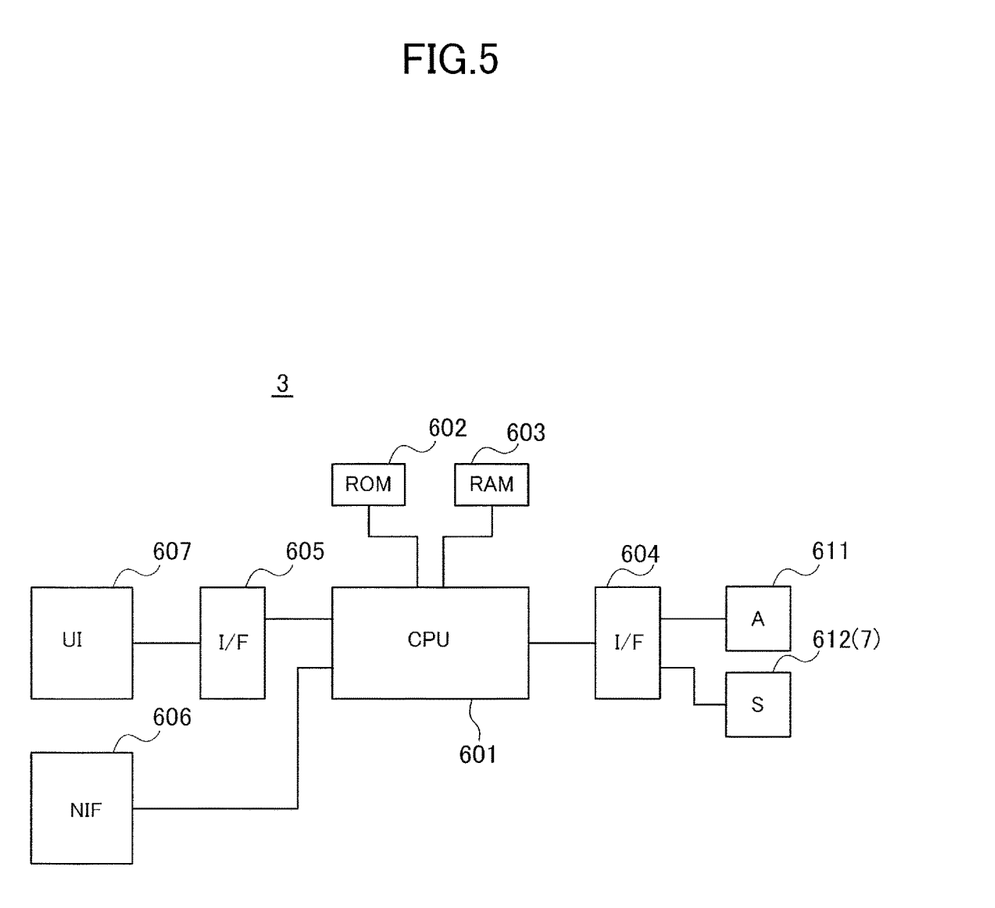
FIG. 5 is a block diagram illustrating a configuration example of a control system according to the present embodiment.

In the present embodiment, each station 101 through 103 is equipped with a control unit 3 illustrated in FIG. 5, and each control unit controls the conveyance apparatus 4 of its own station autonomously to perform conveyance motion of the conveyance apparatus 4. In the present embodiment, as illustrated in FIG. 4, a photosensor 7 is arranged on the workpiece table 9 for this conveyance motion. The photosensor 7 functions as a sensor, i.e., motion detector, for detecting the conveyance motion of the conveyance apparatus 4 of the adjacent production apparatus. The photosensor 7 measures the distance to the workpiece table 9 of the conveyance apparatus 4 of the adjacent production apparatus using a laser beam and the like, and the conveyance motion of the conveyance apparatus 4 can be detected by detecting the change in relative distance between the conveyance apparatuses.

As described above, the control unit 3 for controlling each station is provided in the respective stations 101 through 103. The control unit 3 can be arranged below the assembly base 2, for example. Further, a component supply area 10 is arranged within an operation area on an X-Y plane in the horizontal direction of the assembly robot 5 above the assembly base 2. In the component supply area 10, a supply device of assembly components, the details of which is not shown, supply components. Further, the component supply area 10 can be composed liftably in the Z-axis direction, i.e., vertical direction, by a Z-axis movement apparatus (not shown) similar to the Z-axis movement apparatus 61. According to this configuration, the supplied component can be handed over to the assembly robot 5. The assembly robot 5 that has received the component can be moved in X and Y axis directions, i.e., horizontal direction, to a position above the workbench 6, and the component gripped by the assembly robot 5 can be attached to the workpiece W by lifting the workbench 6.

FIGS. 2A through 2C illustrate different states of the conveyance apparatus 4 in the manufacturing line composed of the stations 101, 102 and 103 of FIG. 1. The conveyance apparatus 4 of the station 103 is not shown in FIGS. 2A and 2B. The assembly robot 5 is not shown in FIG. 2C.

FIG. 2A illustrates a state of the conveyance apparatus 4 before conveying the component to an adjacent downstream station. In this state, the conveyance apparatuses 4 of the stations 101 and 102 (and 103, although not shown) are respectively contracted to be stored on the assembly base 2 of the own production apparatus, and this position of the conveyance apparatus 4 corresponds to a state where the workpiece table 9 is positioned at the original start point.

In the respective stations, the following operations are performed, for example, until the above-described state is realized. At first, the hand 53 of the assembly robot 5 grips the workpiece W in the component supply area 10. Next, the workpiece W is moved in X and Y directions, i.e., horizontal direction, by the X-axis movement apparatus 51 and the Y-axis movement apparatus 52, and moves to the position above, i.e., in the Z-axis direction of, the workbench 6. Then, the Z-axis movement apparatus 61 moves up and down, and the hand 53 releases the gripping operation, by which the workpiece W is placed on the workbench 6.

Next, after the workpiece W placed on the workbench 6 is subjected to predetermined operation, the hand 53 of the assembly robot 5 moves above the workpiece W. Next, the Z-axis movement apparatus 61 rises to move the workpiece W to a height enabling the workpiece W to be gripped by the hand 53. Then, the workpiece W gripped by the hand 53 is moved to the original start position of the workpiece table 9 of the conveyance apparatus 4 by the X-axis movement apparatus 51 and the Y-axis movement apparatus 52. The original start position is the delivery position for transferring the workpiece W to which the process performed in the station is completed, that is, the workpiece W to be conveyed to the downstream station, from the hand 53 to the conveyance apparatuses 4.

FIG. 2B illustrates a state where the workpiece table 9 is expanded downstream by the conveyance apparatus 4 and the workpiece W is conveyed to the adjacent station on the downstream side. The position of the workpiece W on the workpiece table 9 of the station 101 after conveying the workpiece is the same position as the delivery position of the station 102 positioned adjacent to the station 101 on the downstream side. Now, the hand 53 of the station 102 is positioned at the delivery position of the workpiece W. Therefore, by adopting this arrangement, the hand 53 of the assembly robot 5 of the station 102 can grip the conveyed workpiece W speedily.

According to the production system of the present embodiment, a plurality of stations are arranged such that the conveyance area of the conveyance apparatus 4 of each station is overlapped with that of the adjacent station. When conveying the workpiece W downstream, at first, conveyance operation is started from the conveyance apparatus 4 of the station 103 at the lowermost stream side in the direction of movement in which the conveyance motion is performed, as illustrated in FIG. 2C. Next, the photosensor 7 of the conveyance apparatus 4 of the station 102 on the upstream side adjacent to the lowermost station 103 detects the conveyance motion of the conveyance apparatus 4 of the station 103, and based on that information, the control unit 3 of the station 102 starts the conveyance motion of the conveyance apparatus 4 of the station 102. By controlling the sequence of operation timings arbitrarily, the conveyance motion of the respective stations may be consecutively performed at high speed in a linked manner. Thereby, for example, the respective rails configuring the conveyance apparatus 4 can respectively enter the space generated by the movement of the rail at the same stage on the downstream side. Accordingly, a driven state of the conveyance apparatus 4 can be formed as illustrated in FIG. 2B, and interference of conveyance apparatuses of adjacent stations will not occur. Hereafter, the configuration of the above-described control system of the conveyance apparatus 4 and the control procedure thereof will be described with reference to FIG. 5 and the flowchart of FIG. 3.

FIG. 5 illustrates a configuration example of the control unit 3 equipped in each station 101 through 103. The control unit 3 of FIG. 5 includes a CPU 601 serving as a main control unit, a ROM 602 and a RAM 603 serving as a storage device. A control program of the CPU 601 for realizing a control procedure described later, and a constant information can be stored in the ROM 602. Further, the RAM 603 is used, for example, as a work area of the CPU 601 during execution of the control procedure described later.

A control program of the CPU 601 for realizing the control procedure described later can be stored in an external storage device such as an HDD or an SSD not shown, or in a storage unit such as an EEPROM area of the ROM 602. In that case, the control program of the CPU 601 configured to realize the control procedure described later is supplied to the respective storage portions through a network interface 606, or the control program can be updated to a new, or different, program. The control program of the CPU 601 for realizing the control procedure described later is supplied to the respective storage portions through various storage units such as a magnetic disk, an optical disk or a flash memory, and a drive unit thereof, and the contents thereof can be updated. The various storage units, storage units and recording medium storing the control programs of the CPU 601 for realizing the control procedure described above constitutes a computer-readable recording medium that stores the control procedure according to the present invention.

A drive system 611 and a detection system 612 of the station to which the control unit is provided are connected to the CPU 601 through an interface 604. The drive system 611 includes an actuator such as a motor, a solenoid or an air cylinder that constitutes a driving source of the hand 53, the X-axis movement apparatus 51, the Y-axis movement apparatus 52 and the Z-axis movement apparatus 61. The detection system 612 includes, in addition to the photosensor 7 disposed on the above-described workpiece table 9, a sensor such as a linear/rotary encoder or a force sensor arranged at respective portions of the drive system to be used for feedback control of driving quantity or driving force of the drive system 611.

A UI device, i.e., user interface device, 607 can be connected through an interface 605 to the CPU 601. The UI device 607 is not indispensable in the station according to the present embodiment, and it can be composed of a terminal such as a handy terminal or a control terminal including a keyboard, a display and a pointing device and the like. If such UI device 607 is provided, an operator can instruct operation to the station through the UI device 607 or correct control data that has been instructed.

A network interface 606 serving as a communication unit is connected to the CPU 601. The CPU 601 can communicate control signals necessary for controlling production through the network interface 606. The network interface 606 can adopt telecommunications standards, including wire communication such as IEEE 802.3 and wireless communication such as IEEE 802.11 or 802.15. The network interface 606 can be used for communication between a supervisory control unit such as a PLC that performs production management disposed on the manufacturing line according to the present embodiment and a management server and the like, both of which are not shown. Further, the network interface 606 can also be used for transmitting and receiving control signals among the control units 3 of the respective stations 101 through 103.

Figure 3:
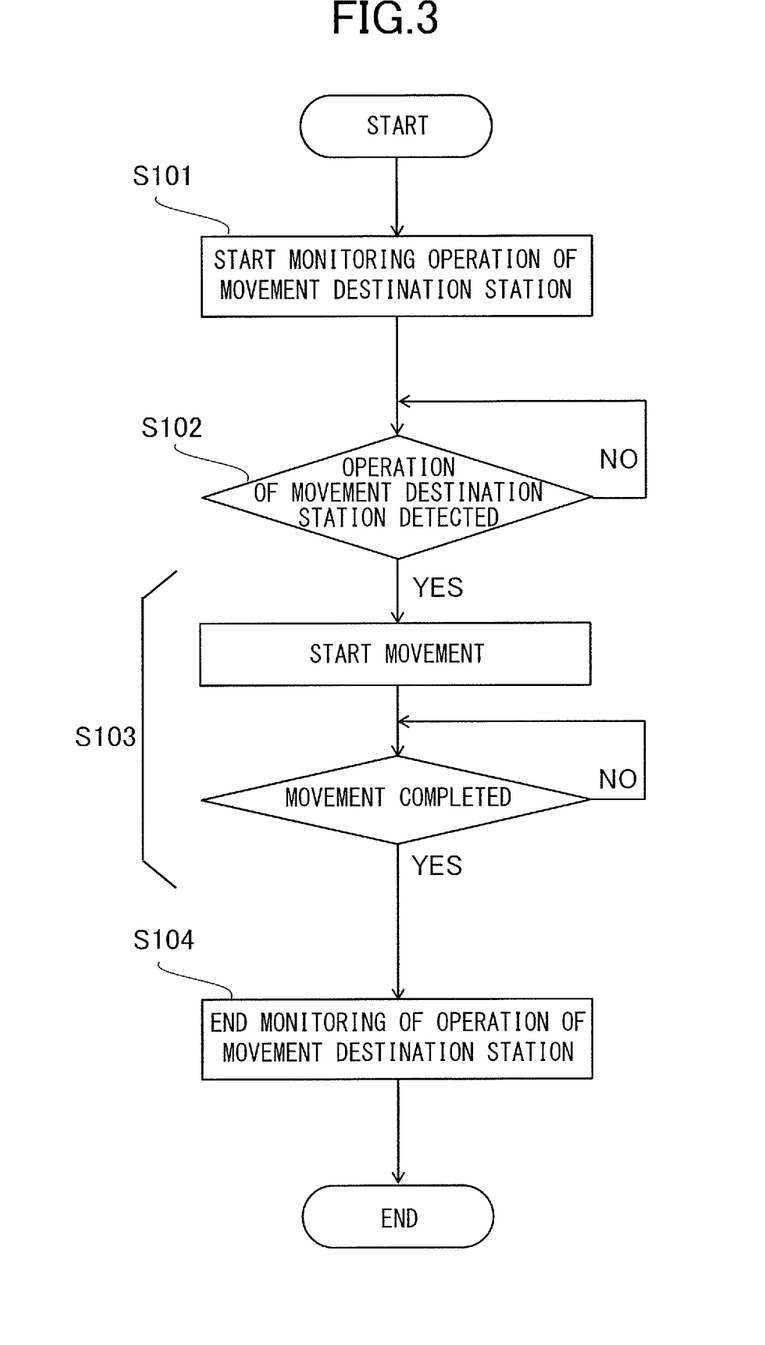
FIG. 3 is a flowchart illustrating a control procedure of a conveyance apparatus of a robot station.

FIG. 3 illustrates an outline of a control procedure in which the CPU 601 of the control unit 3 controls the conveyance apparatus 4 according to the output of the photosensor 7. The control procedure of FIG. 3 can be stored in a storage unit such as the ROM 602 mentioned above as a control program capable of being executed by the CPU 601.

The conveyance of the workpiece W to the adjacent station is performed by performed by moving the workpiece table 9 using the conveyance apparatus 4. This operation is performed by steps S101 through S104 of FIG. 3.

According to the configuration illustrated in FIGS. 1 and 2, upon conveying the workpiece W to the adjacent station, at first, the station 103 which located on the most downstream side in the line starts the conveyance motion. The station 102 on the upstream side adjacent to the station 103 monitors the starting of movement of the conveyance apparatus 4 on the downstream side using the photosensor 7 on the workpiece table 9 of the conveyance apparatus 4 included in the own production apparatus (S101), and if the photosensor 7 detects the conveyance motion (S102), the conveyance apparatus 4 of the own production apparatus starts conveyance motion (S103). The station 101 on the upstream side adjacent to the station 102 similarly detects the conveyance motion of the conveyance apparatus 4 of the station 102 and starts conveyance motion of the conveyance apparatus 4 of the own production apparatus.

Regarding the driving of the conveyance apparatus 4 of the respective stations, if the workpiece table 9 of the conveyance apparatus 4 reaches a target position, such as below the hand 53 of the adjacent station, the control of FIG. 3 is ended and the driving of the conveyance apparatus 4 is stopped.

As described, according to the configuration and control procedure of the present embodiment, the respective stations 101 through 103 and so on are configured to independently control the conveyance apparatus 4 by the control unit 3 autonomously without providing an integrated control unit such as a PLC for controlling the respective stations integrally.

According to the conveyance motion control as illustrated in FIG. 3, in a space-saving conveyance apparatus where dedicated areas for transferring workpieces are not secured between mutually adjacent stations 101 through 103 configured as illustrated in FIGS. 1 and 2, conveyance motions of stations can be realized independently, simulating synchronization control. Therefore, workpiece transfer of the conveyance apparatus can be performed in a short time without having to standby sequentially until the station to which the workpiece is being moved finishes the conveyance motion.

As described, according to the present embodiment, the respective stations in the manufacturing line are configured perform conveyance motion independently, and there is no need to secure a large space for the conveyance apparatus. Therefore, the time required for transferring and receiving the workpiece in the conveyance apparatus with respect to production cycle time (tact time) can be shortened, the operation rate of the manufacturing line can be improved, and occupation area of the manufacturing line can be downsized.

In the above description, an embodiment has been described based on a configuration illustrated as an example, but the configuration illustrated as an example in the above-described embodiment is not intended to limit the scope of the present invention to the illustrated configuration. For example, in the above-described embodiment, a photosensor 7 is used as the motion detector, i.e., conveyance motion detector, arranged on both sides in the conveyance direction of the workpiece table 9, but other detection sensors such as a camera or other image processing sensors can also be used. The photosensors 7 configured to detect conveyance motion can be arranged on posts of respective stations, instead of on the workpiece table 9.

In the above description, the right direction of FIGS. 1 and 2 has been described as the "downstream" side of conveyance direction in which the conveyance apparatus 4 conveys the workpiece W. However, a similar conveyance motion can be implemented in a configuration configured to convey the workpiece W also in the opposite direction, such as a manufacturing line configured to convey the workpiece W in both directions to adjacent stations on both sides. For example, the above-described conveyance motion may be implemented in a production system where a workpiece W is transferred back and forth between two specific stations to proceed with the production processes of the components.

The present invention may also be realized by supplying a program for realizing one or more functions of the above-described embodiment to a system or an apparatus through a network or a storage medium and having one or more processors in a computer of the system or the apparatus read and execute the program. Further, the present invention may also be realized by a circuit, for example, an ASIC, configured to realize one or more functions mentioned above.

Second Embodiment

A second embodiment relates to an embodiment in which, if one of the stations 101 through 103 is stopped due to abnormality, i.e., abnormally stopped, operation can be performed to avoid problems of collision of conveyance apparatuses 4. In this description, "abnormally stopped" refers to respective stations 101 through 103 being in a stopped state, or controlled to be stopped, due to some reason, such as a physical mechanical jamming, or detection of abnormality by some sensor.

Figure 8:
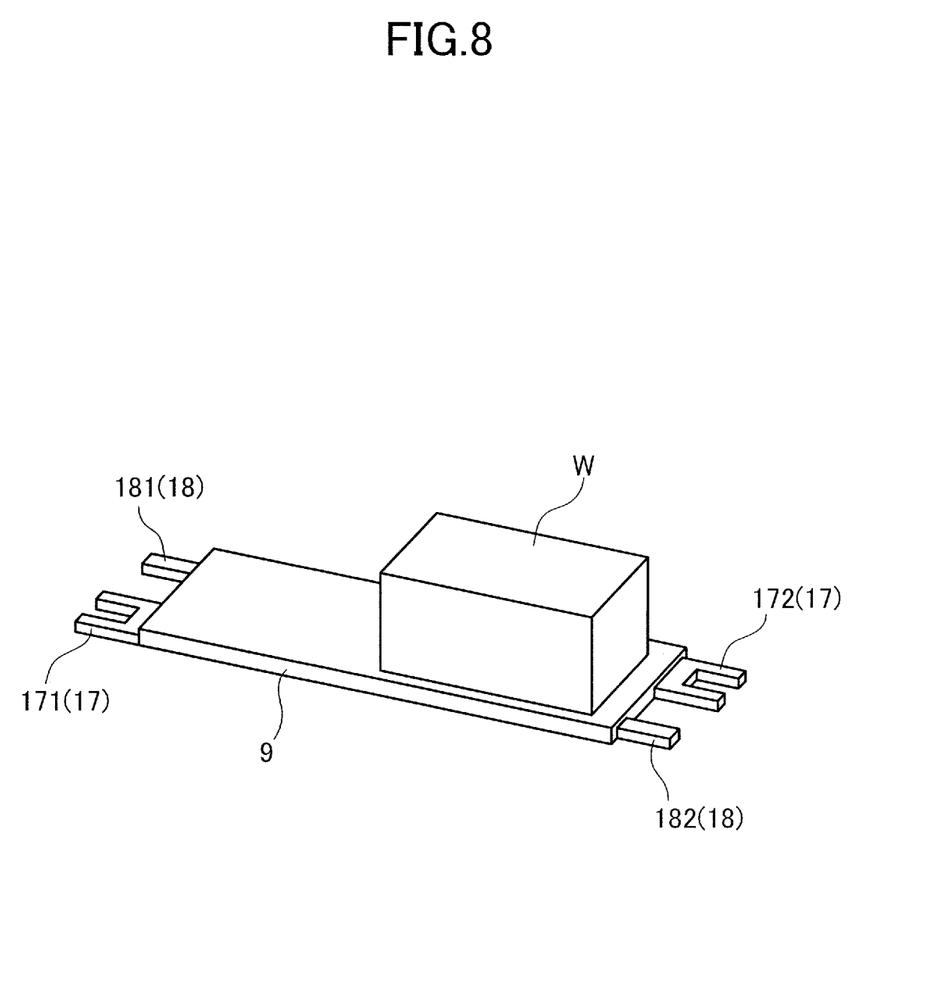
FIG. 8 is a perspective view illustrating a configuration example of a workpiece table conveyed by the conveyance apparatus.

As illustrated in FIG. 8, the second embodiment differs from the first embodiment in that the respective stations 101 through 103 are provided with photosensors 17 serving as sensors at positions capable of detecting a dog 18 on an adjacent station. A dog is a member serving as a target of detection of the photosensor. In the present embodiment, a dog 18 (181 or 182) and a photosensor 17 (171 or 172) are arranged side by side to protrude at least from a first end, or preferably from both ends, of the workpiece table 9 configuring a portion of the conveyance apparatus 4. Naturally, the dog 18 (181 or 182) is arranged at a position detectable by the photosensor 17 (171 or 172) on the adjacent station. Further, the photosensor 17 (171 or 172) is arranged at a position capable of detecting the dog 18 (181 or 182) on the adjacent station. Accordingly, for example, the dog 18 (181 or 182) and the photosensor 17 (171 or 172) are arranged at complementary positions on the first end and a second end of the workpiece table 9 as illustrated, at rotation symmetry positions in the illustrated example.

The sensor composed of the dog 18 and the photosensor 17 functions as a sensor configured to detect interference between the conveyance apparatus 4 and the conveyance apparatus 4 of the adjacent production apparatus. The photosensor 17 can be composed, for example, of a so-called photo-interrupter where a light source and a photosensing portion are arranged to oppose to each other on two arms separated by a distance that allows the dog 18 to be inserted therebetween. In that case, the state of interference of the conveyance apparatuses 4 can be detected by the dog 18 of the adjacent station interrupting the light of the photosensor 17 on the workpiece table 9 arranged on the conveyance apparatus 4 of the own production apparatus.

A sensor that detects the conveyance motion, i.e., motion detector, is not illustrated in FIG. 8, but the function thereof can also be provided in the photosensor 17. Furthermore, an independent photosensor 7 that detects conveyance motion can be arranged on the workpiece table 9 as illustrated in FIG. 4. Even further, the photosensor 7 that detects the conveyance motion can be arranged on the posts of the respective stations, instead of on the workpiece table 9.

In the present embodiment, a plurality of stations 101 through 103 are arranged such that the conveyance areas of the respective conveyance apparatuses 4 are overlapped. Therefore, even if one of the stations 101 through 103 is in the abnormally stopped state as described above, physical interference such as collision may occur between the conveyance apparatuses 4. Such physical interference may also occur by deviation of timing if the processing operation and the conveyance motion are controlled autonomously.

Meanwhile, according to the present embodiment, sensors each composed of the dog 18 and the photosensor 17 that detect the state of interference of the conveyance apparatuses are arranged at complementary positions on both ends of the workpiece table 9 of the respective stations 101 through 103. Therefore, if the interference sensor composed of the dog 18 and the photosensor 17 detects the state of interference of adjacent conveyance apparatuses 4, the control unit 3 of the respective stations 101 through 103 will perform interference avoidance control using the output from the sensor.

According to the interference avoidance control, at first, if the photosensor 17 detects the state of interference, the conveyance apparatus 4 is temporarily stopped immediately. Thereafter, if the photosensor 17 on the first end of the workpiece table 9 detects the state of interference, for example, the control unit 3 of the relevant station moves the conveyance apparatus 4 to a direction where state of interference is not detected, that is, to a direction resolving the state of interference. For example, if the photosensor 17 on the first end (right side) in FIGS. 1 and 2, of the workpiece table 9 detects the state of interference and the photosensor 7 on the second end (left side) does not detect the state of interference, the workpiece table 9 is moved to the second end (left side). That is, according to the present embodiment, interference sensors each composed of the photosensor 17 detecting the dog 18 of an adjacent station are arranged on both ends of the workpiece table 9, such that the interference avoidance direction can be determined from the output of the photosensor 17.

Figure 9:
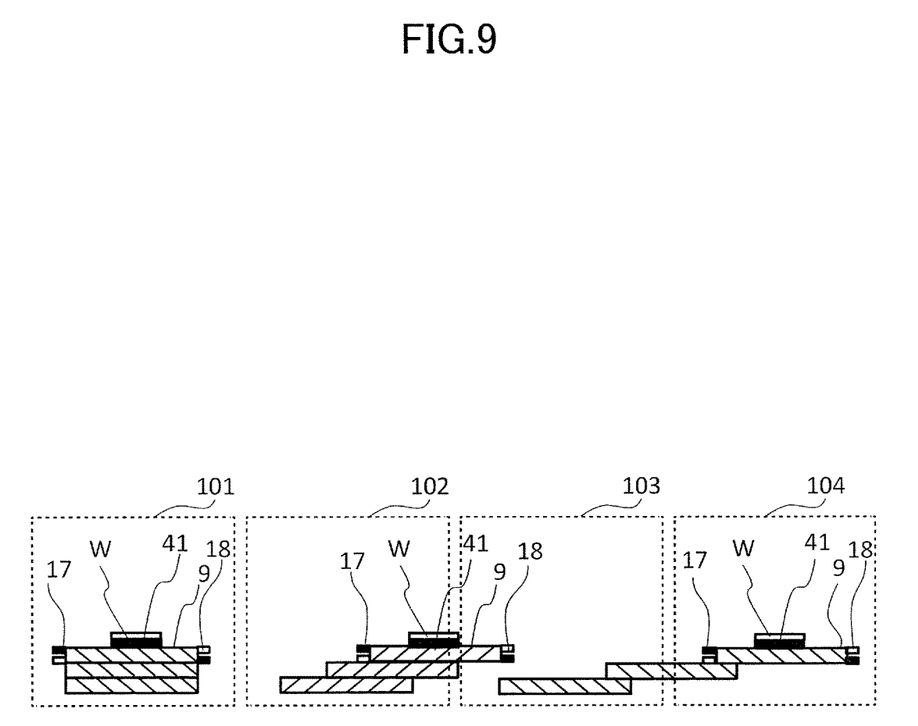
FIG. 9 is an explanatory view illustrating a state of the conveyance apparatus in the production system illustrated in FIG. 1, after being abnormally stopped.

FIG. 9 illustrates an example of a state after interference avoidance control has been performed in a state where the station 102 and the station 103 interfere and are abnormally stopped while the conveyance apparatus 4 has been performing a conveyance motion as illustrated in FIG. 2B. It is assumed that the conveyance apparatus 4 of the station 102 in abnormally stopped state and the conveyance apparatus 4 of the station 103 having been moved to the left side in the drawing are in a state of interference. In that case, since the interference avoidance direction of the station 103 determined by the photosensor 17 is toward the direction of station 104, that is, right side in the drawing, the conveyance apparatus 4 advances to a position where the workpiece W is carried onto the station 104, as illustrated.

Furthermore, it is assumed that the conveyance apparatus 4 of the station 102 in abnormally stopped state and the conveyance apparatus 4 of the station 101 moved to the right side in the drawing are in a state of interference. In that case, in the station 101, since the interference avoidance direction determined by the photosensor 17 is the direction of the original start position of the own production apparatus (left side in the drawing), the conveyance apparatus 4 advances to the original start position of the own production apparatus as illustrated.

As for the conveyance apparatus 4 moved to the interference avoidance direction as described above, the control unit 3 performs control to stop the conveyance apparatus 4 if the conveyance apparatus 4 reaches the original start position or a position having entered the adjacent station. Now, the control procedure of the interference avoidance control of the conveyance apparatus 4 as described above will be described with reference to the flowcharts of FIGS. 6 and 7.

Figure 6:
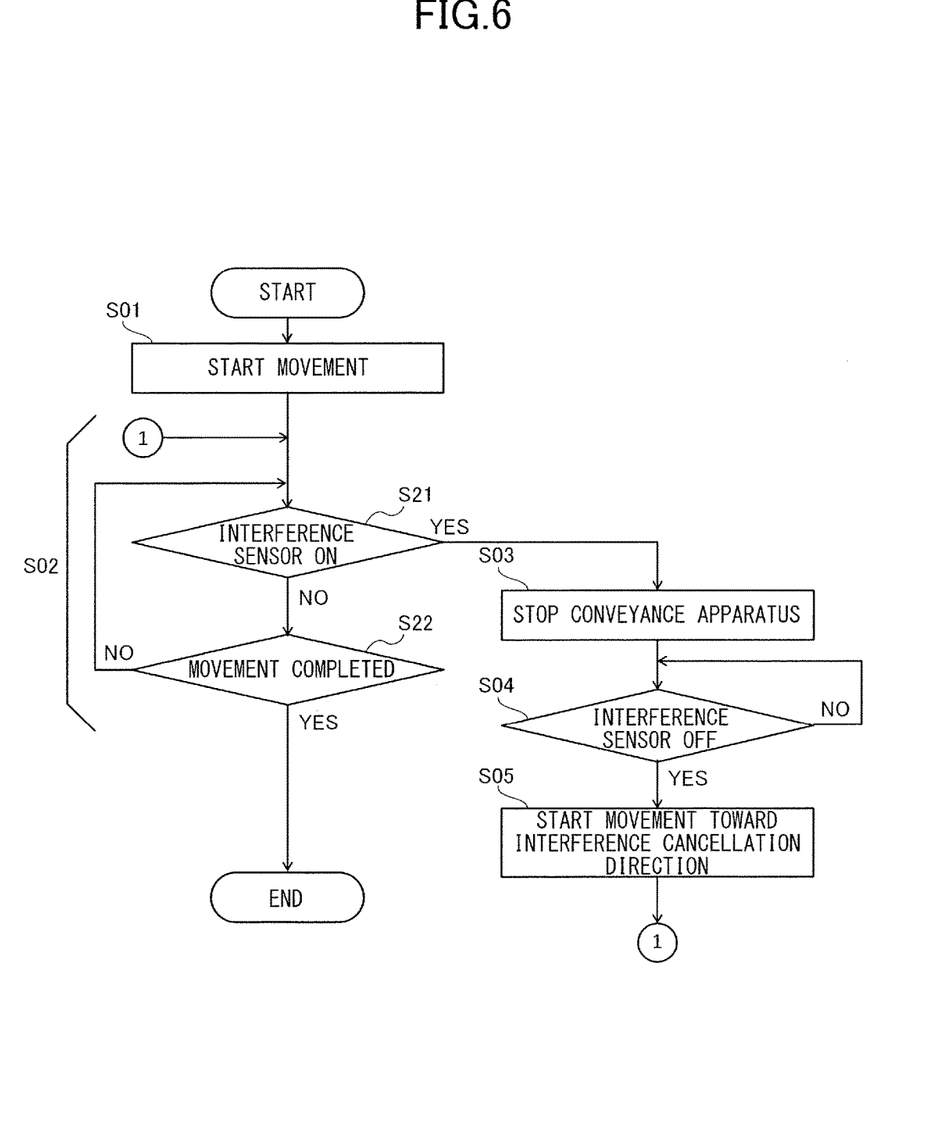
FIG. 6 is a flowchart illustrating a control procedure of the conveyance apparatus of a robot station including an interference avoidance control.

FIG. 6 illustrates an outline of a control procedure of the CPU 601 of the control unit 3 controlling the conveyance apparatus 4 in accordance with the output of the interference sensor composed of the dog 18 and the photosensor 17. The CPU 601 may store the control procedure of FIG. 6, and similarly FIG. 7, as an executable control program in a storage unit such as the ROM 602 described above.

The conveyance of the workpiece (W) to the adjacent station is carried out by moving the workpiece table 9 by the conveyance apparatus 4. This operation is carried out by steps S01 and S02 (S21 and S22) of FIG. 6.

In the configuration illustrated in FIGS. 1 and 2, if the workpiece (W) is to be conveyed to the adjacent station, all the stations 101 through 103 move the conveyance apparatus 4 almost simultaneously and start conveyance of the workpiece to the station adjacent in the downstream side of each station (S01). That is, the conveyance apparatus is moved from the state of FIG. 2A to the state of FIG. 2B. The driving of the conveyance apparatus 4 is continued until the conveyance apparatus 4 detects (S22) that the workpiece table 9 has reached a target position, such as below the hand 53 of the adjacent station. If it is detected that the workpiece table 9 has reached the target position (S22), the control of FIG. 6 is ended and the driving of the conveyance apparatus 4 is stopped.

While the workpiece (W) is conveyed by the conveyance apparatus 4, the CPU 601 of the control unit 3 monitors the state of the photosensor 17 installed on the workpiece table 9 (S21). If the conveyance apparatus 4 adjacent in the direction of movement of the own production apparatus is abnormally stopped in midway by some reason, the dog 18 on the workpiece table 9 of the adjacent conveyance apparatus 4 intercepts the photosensor 17 on the workpiece table 9 of the own production apparatus (interference sensor ON). Thereby, the state of interference between the conveyance apparatus 4 of the own production apparatus and the adjacent conveyance apparatus 4 is detected.

If interference between the conveyance apparatuses 4 caused by the adjacent station being abnormally stopped and the like is detected, at first, the CPU 601 stops the conveyance apparatus 4 of the own production apparatus (S03).

Thereafter, in step S04, the CPU 601 checks output of both photosensors 171 and 172 (FIG. 8) arranged on both sides in the conveyance direction of the workpiece table 9 of the own production apparatus. Then, based on the photosensors 171 and 172, the direction of the photosensor 17 having detected that the state of interference is OFF is determined, or selected, as the interference avoidance direction, i.e., interference resolving direction, of the conveyance apparatus 4. That is, the CPU 601 of the control unit 3 determines the interference avoidance operation of the conveyance apparatus according to the state of detection of the interference sensors, i.e., photosensors 171 and 172 detecting the dogs 181 and 182, on both ends of the workpiece table 9. Step S04 is configured as a control loop that waits for the state of interference of one of the photosensors 171 and 172 to be OFF. Therefore, while it is not possible to detect, or select, the interference avoidance direction, i.e., interference resolving direction, the stopped state of the conveyance apparatus 4 started in step S03 is continued.

If the interference detection output of either the photosensor 171 or 172 is turned OFF in step S04, the procedure advances to step S05, and movement of the conveyance apparatus 4 to the interference avoidance direction is started. Even during this interference avoidance operation of the conveyance apparatus 4, the determination of step S02 (S21, S22) is executed while continuing to drive the conveyance apparatus 4 to the interference avoidance direction. During the process, if an event occurs in which the photosensor 171 or 172, i.e., interference sensor, disposed on one of the end portions of the workpiece table 9 is turned ON (S21: Y), an another interference avoidance operation is started based on a control similar to that described above.

In step S04, the conveyance apparatus 4 may be moved slightly to perform trial to detect the interference avoidance direction. However, there is no need to perform trial successively for unlimited number of times until the interference avoidance direction is detected. For example, if the interference detection output of the photosensors 171 and 172 is not turned OFF after performing the trail of moving the conveyance apparatus 4 slightly for a predetermined number of times, the conveyance apparatus 4 is abnormally stopped and set to standby.

The conveyance apparatuses 4 of the plurality of stations 101 through 103 arranged in a row may be operated simultaneously in synchronization, for example, by connecting the control units 3 of the respective stations through a network and simultaneously transmitting a conveyance command signal from a superior device such as a PLC. However, according to the configuration of the present embodiment, an interference sensor, which is a combination of the dog 18 and the photosensor 17, is disposed in the respective conveyance apparatuses 4 of the respective stations 101 through 103. Therefore, conveyance of components can be performed independently by moving the workpiece (W) back and forth between the respective positions for receiving and transferring the workpiece (W) until the adjacent station is in a transferable state of workpiece (W).

As described, according to the configuration and control procedure of the present embodiment, the respective stations 101 through 103 control the conveyance apparatuses 4 independently and autonomously by the control units 3. Further, the present embodiment enables to have the conveyance apparatuses 4 perform an operation to move in the interference avoidance direction n using the interference sensor, that is, the photosensor 17, of the own production apparatus. Therefore, even without an integrated control unit such as a PLC configured to control the respective stations in an integrated manner, the respective stations can independently drive the conveyance apparatuses 4 autonomously and cause the conveyance apparatuses 4 to perform interference avoidance operation.

According to the interference avoidance control as illustrated in FIG. 6, if one of the stations 101 through 103 is abnormally stopped, the conveyance apparatuses of the other stations are stopped at the original start position or after reaching the position of entry to the adjacent station. As for the station stopped abnormally, the abnormally stopped state is continued at the abnormally stopped position. Therefore, according to the present embodiment, the operator or the administrator of the manufacturing line can specify the abnormally stopped station easily, and the restoration operation of the manufacturing line can be facilitated.

Figure 7:
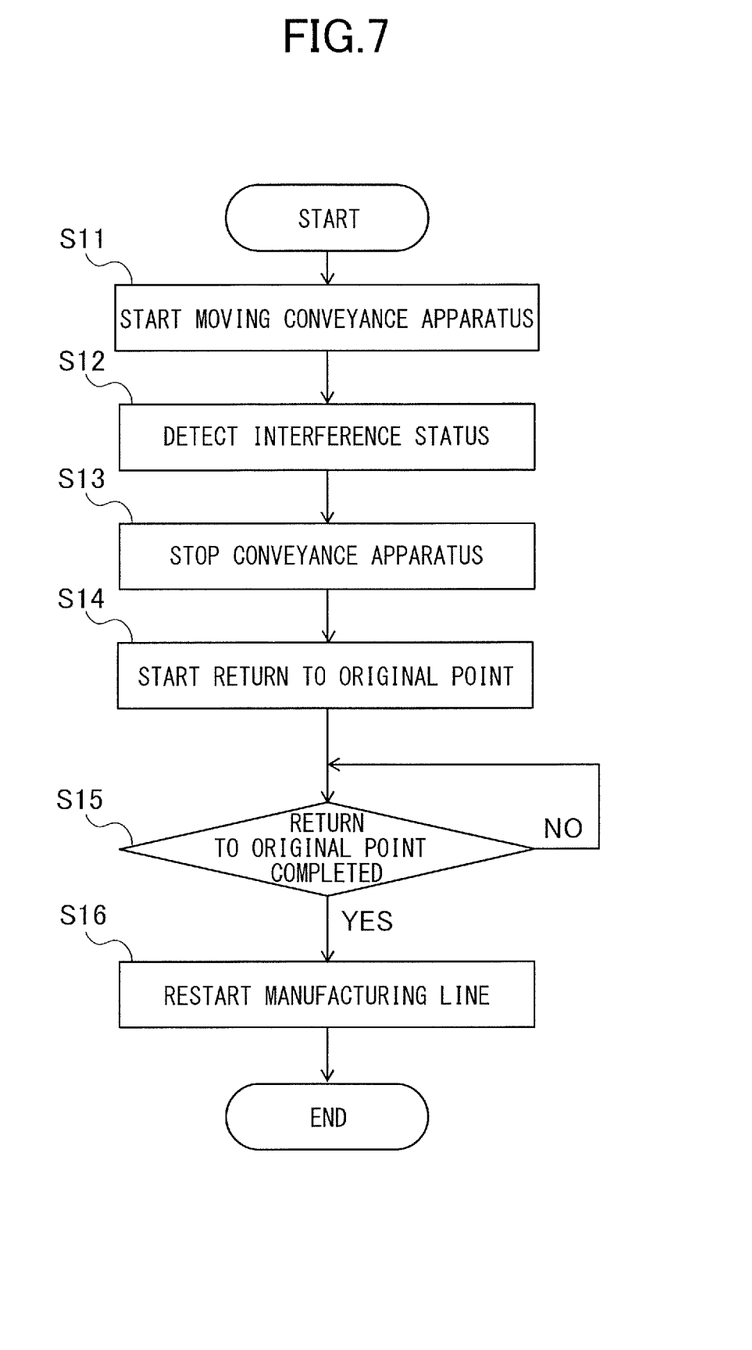
FIG. 7 is a flowchart illustrating a restoration procedure in a case where a station in a manufacturing line is abnormally stopped.

For example, if one of the stations 101 through 103 are abnormally stopped as described above, the operator performs operation as described in the steps of FIG. 7, and the manufacturing line is restored.

In FIG. 7, it is assumed that one of the stations 101 through 103 has been abnormally stopped as described above after the conveyance apparatus 4 has started conveying the workpiece (W) to the adjacent station on the downstream side (S11). In that case, based on the control procedure of FIG. 6, the state of interference is detected by the interference sensor, i.e., the photosensor 17 (S12), and the conveyance apparatuses of other stations are switched to stopped state (S13). That is, as for the station stopped abnormally, the abnormally stopped state is continued at the abnormally stopped position, and the conveyance apparatuses of other stations are either stopped at the original start position or stopped after reaching the position of entry to the adjacent station.

Now, it is assumed that the conveyance apparatus 4 of the station 102 is abnormally stopped. In that case, the conveyance apparatus 4 of the downstream side station 103 is stopped at the position of entry to the station 104 on the downstream side, as illustrated in FIG. 9. Further, the station 101 on the upstream side of the station 102 is stopped at the original start position above the assembly base 2 of the own production apparatus. Now, it is assumed that the stations 101 and 103 other than the station 102 where abnormally stopped state has occurred are in a restartable state.

Therefore, the operator or the administrator of the manufacturing line removes the cause of abnormality of the abnormally stopped station, such as 102, manually, for example. In this state, any operation required to remove the cause of abnormality, such as replacing or repairing a component of a mechanism or removing an obstacle, can be performed. Thereafter, a program to return the conveyance apparatus 4 to the original point is started (S14) only in the abnormally stopped station, such as 102, using the UI device 607 (FIG. 5), for example, to return the conveyance apparatus 4 to the original start position (FIG. 2A). If the conveyance apparatus 4 of the abnormally stopped station, such as 102, is returned to the original start position (FIG. 2A) in response to this operation (S15), the manufacturing line is ready to be restarted (S16).

As described, according to the present embodiment, even if the conveyance apparatus 4 is abnormally stopped in one of the stations of the manufacturing line, the abnormally stopped production apparatus can be specified easily, such that necessary operations can be performed to restore the manufacturing line speedily, and the operation rate of the manufacturing line can be improved.

The above description has been descried based on configurations illustrated as the embodiment, but the configuration illustrated as the present embodiment is not intended to limit the scope of the present invention to the illustrated configuration. For example, a combination of the photosensor 17 and the dog 18 was used as the interference sensor disposed on both sides in the conveyance direction of the workpiece table 9, but other types of interference, or proximity, sensors such as those adopting a magnetic member and a magnetic sensor can be adopted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-118513, filed Jun. 16, 2017, and Japanese Patent Application No. 2018-092565, filed May 11, 2018, which are hereby incorporated by reference wherein in their entirety.

What is claimed is:

1. A production system in which a plurality of production apparatuses are arranged adjacently, wherein at least one of the production apparatuses comprises:
   a workbench on which a workpiece is placed, the workbench being configured to subject the workpiece to a predetermined operation;
   a movement apparatus configured to move the workpiece subjected to the predetermined operation on the workbench to a predetermined delivery position;
   a first conveyance apparatus configured to convey the workpiece moved to the predetermined delivery position to an adjacent production apparatus that comprises a second conveyance apparatus and is arranged on a downstream side;
   a motion detector configured to detect starting of movement of the second conveyance apparatus of the adjacent production apparatus on the downstream side; and
   a control unit configured to operate the movement apparatus to move the workpiece on the workbench to the predetermined delivery position,
   wherein, if the starting of movement of the second conveyance apparatus of the adjacent production apparatus on the downstream side is detected by the motion detector, the control unit operates the first conveyance apparatus to convey the workpiece to a delivery position of the adjacent production apparatus on the downstream side, and
   wherein the at least one of the plurality of production apparatuses is arranged such that a conveyance area of the first conveyance apparatus overlaps a conveyance area of the second conveyance apparatus of the adjacent production apparatus on the downstream side.

2. The production system according to claim 1, wherein the movement apparatus comprises a gripping apparatus configured to grip the workpiece, and an orthogonal robot configured to move the gripping apparatus in a horizontal direction.

3. The production system according to claim 1, wherein the workbench comprises a lifting apparatus configured to lift and lower the workpiece on the workbench in a vertical direction.

4. The production system according to claim 1, wherein the first conveyance apparatus comprises a lifting apparatus configured to lift and lower the workpiece in a vertical direction.

5. The production system according to claim 1, wherein the first conveyance apparatus comprises an interference detector provided on an end portion of the first conveyance apparatus configured to detect interference with the second conveyance apparatus of the adjacent production apparatus on the downstream side.

6. The production system according to claim 1, wherein the delivery position of the adjacent production apparatus on the downstream side before the first conveyance apparatus conveys the workpiece to the adjacent production apparatus on the downstream side is the same position as the delivery position of the adjacent production apparatus on the downstream side after the first conveyance apparatus conveys the workpiece to the adjacent production apparatus on the downstream side.

7. The production system according to claim 1, wherein the first conveyance apparatus comprises an expandable rail member comprising multiple stages.

8. A method for controlling a production system in which a plurality of production apparatuses are arranged adjacently, wherein at least one of the production apparatuses comprises:
   a workbench on which a workpiece is placed, the workbench being configured to subject the workpiece to a predetermined operation;
   a movement apparatus configured to move the workpiece subjected to the predetermined operation on the workbench to a predetermined delivery position;
   a first conveyance apparatus configured to convey the workpiece moved to the predetermined delivery position to an adjacent production apparatus that comprises a second conveyance apparatus and is arranged on a downstream side;
   a motion detector configured to detect starting of movement of the second conveyance apparatus of the adjacent production apparatus on the downstream side; and
   a control unit configured to control the conveyance apparatus,
   wherein the at least one of the plurality of production apparatuses is arranged such that a conveyance area of the first conveyance apparatus overlaps a conveyance area of the second conveyance apparatus of the adjacent production apparatus on the downstream side,
   wherein the method comprises steps of:
      controlling the movement apparatus to move the workpiece on the workbench to the predetermined delivery position, and
      operating the first conveyance apparatus to convey the workpiece to the delivery position of the adjacent production apparatus when the start of movement of the second conveyance apparatus of the adjacent production apparatus is detected by the motion detector.

9. The method for controlling the production system according to claim 8, wherein the movement apparatus comprises a gripping apparatus configured to grip the workpiece, and an orthogonal robot configured to move the gripping apparatus in a horizontal direction, and
   wherein the control unit performs control to operate the gripping apparatus to grip the workpiece placed on the workbench and move the workpiece to the predetermined delivery position.

10. The method of controlling the production system according to claim 9, wherein the workbench comprises a first lifting apparatus configured to lift and lower the workpiece on the workbench in a vertical direction, and
    wherein the control unit performs control to lift and lower the workpiece placed on the workbench to a height allowing the gripping apparatus to perform the predetermined operation.

11. The method for controlling the production system according to claim 9, wherein the first conveyance apparatus comprises a second lifting apparatus configured to lift and lower the workpiece in a vertical direction, and
    wherein the control unit performs control to lift and lower the workpiece to a height allowing the gripping apparatus to perform a predetermined operation.

12. The method for controlling the production system according to claim 8, wherein the first conveyance apparatus comprises an interference detector provided on an end portion of the first conveyance apparatus configured to detect interference with the second conveyance apparatus of the adjacent production apparatus on the downstream side, and
    wherein, if the interference of the first conveyance apparatus and the second conveyance apparatus of the adjacent production apparatus is detected by the interference detector, the control unit moves the first conveyance apparatus in an interference avoidance direction to avoid the interference.

13. The method for controlling the production system according to claim 12, wherein if the interference is detected, the control unit abnormally stops the first conveyance apparatus, and thereafter, moves the first conveyance apparatus to an original start position.

14. A non-transitory computer readable medium which stores a program causing the computer to execute the method as set forth in claim 8.

* * * * *